United States Patent
Miller et al.

(10) Patent No.: US 6,934,147 B2
(45) Date of Patent: Aug. 23, 2005

(54) SWITCHGEAR CONDUCTORS AND CONNECTIONS THEREFORE

(75) Inventors: Michael Wayne Miller, Burlington, IA (US); William Saldeen, Burlington, IA (US)

(73) Assignee: General Electric Company, Schenectady, NY (US)

(*) Notice: Subject to any disclaimer, the term of this patent is extended or adjusted under 35 U.S.C. 154(b) by 6 days.

(21) Appl. No.: 10/764,965

(22) Filed: Jan. 26, 2004

(65) Prior Publication Data

US 2005/0162817 A1    Jul. 28, 2005

(51) Int. Cl.[7] ............................................. H02B 1/20
(52) U.S. Cl. ....................... 361/611; 174/68.2; 174/72 B
(58) Field of Search ................ 361/605, 611, 637–639, 361/648–650; 174/68.2, 72 B, 99 B

(56) References Cited

U.S. PATENT DOCUMENTS

| | | | | |
|---|---|---|---|---|
| 3,398,327 | A | * | 8/1968 | Ferris .......................... 361/611 |
| 4,118,639 | A | * | 10/1978 | Rosey et al. ................. 307/147 |
| 4,121,276 | A | * | 10/1978 | Kovatch et al. ............ 361/614 |
| 4,360,849 | A | | 11/1982 | Harris et al. |
| 4,492,831 | A | | 1/1985 | Oakes |
| 4,677,524 | A | | 6/1987 | Shiraishi et al. |
| 4,723,917 | A | | 2/1988 | Cournet et al. |
| 6,040,976 | A | | 3/2000 | Bruner et al. |
| 6,111,745 | A | | 8/2000 | Wilkie, II et al. |
| 6,411,500 | B1 | | 6/2002 | Kaaden et al. |
| 6,433,445 | B1 | | 8/2002 | Ahladas et al. |
| 6,489,567 | B2 | * | 12/2002 | Zachrai .................. 174/149 B |
| 6,510,047 | B2 | | 1/2003 | Meiners et al. |
| 6,551,124 | B1 | | 4/2003 | Gossmann |
| 6,781,818 | B2 | * | 8/2004 | Josten et al. ................ 361/611 |
| 6,870,103 | B1 | * | 3/2005 | Wiant et al. ............... 174/68.2 |

OTHER PUBLICATIONS

Copper Development Association, Copper for Busbars, CDA Publication 22, Jun. 1996 (Reprinted Jan. 2001), pp24-27.

* cited by examiner

Primary Examiner—Boris Chèrvinsky
(74) Attorney, Agent, or Firm—Allan O. Maki; Foster, Swift, Collins & Smith, P.C.

(57) ABSTRACT

A bus assembly for switchgear includes a pair of elongated members each of an L-shaped cross section with a lateral side and a transverse side integral with the lateral side. The elongated members are positioned in a juxtaposed spaced apart relationship forming a hollow rectangular tube wherein the lateral sides are generally parallel to each other and the transverse sides are generally parallel to each other. Support members connected to the lateral sides may be U-shaped components engaging lateral exterior sides of the elongated members and may be connected to an element having flange which extends from the bases of the U-shaped components for connection to a horizontal bus bar. A connecting device may be provided with separated extending legs adapted for attachment to components of a laminated horizontal bus member.

14 Claims, 10 Drawing Sheets

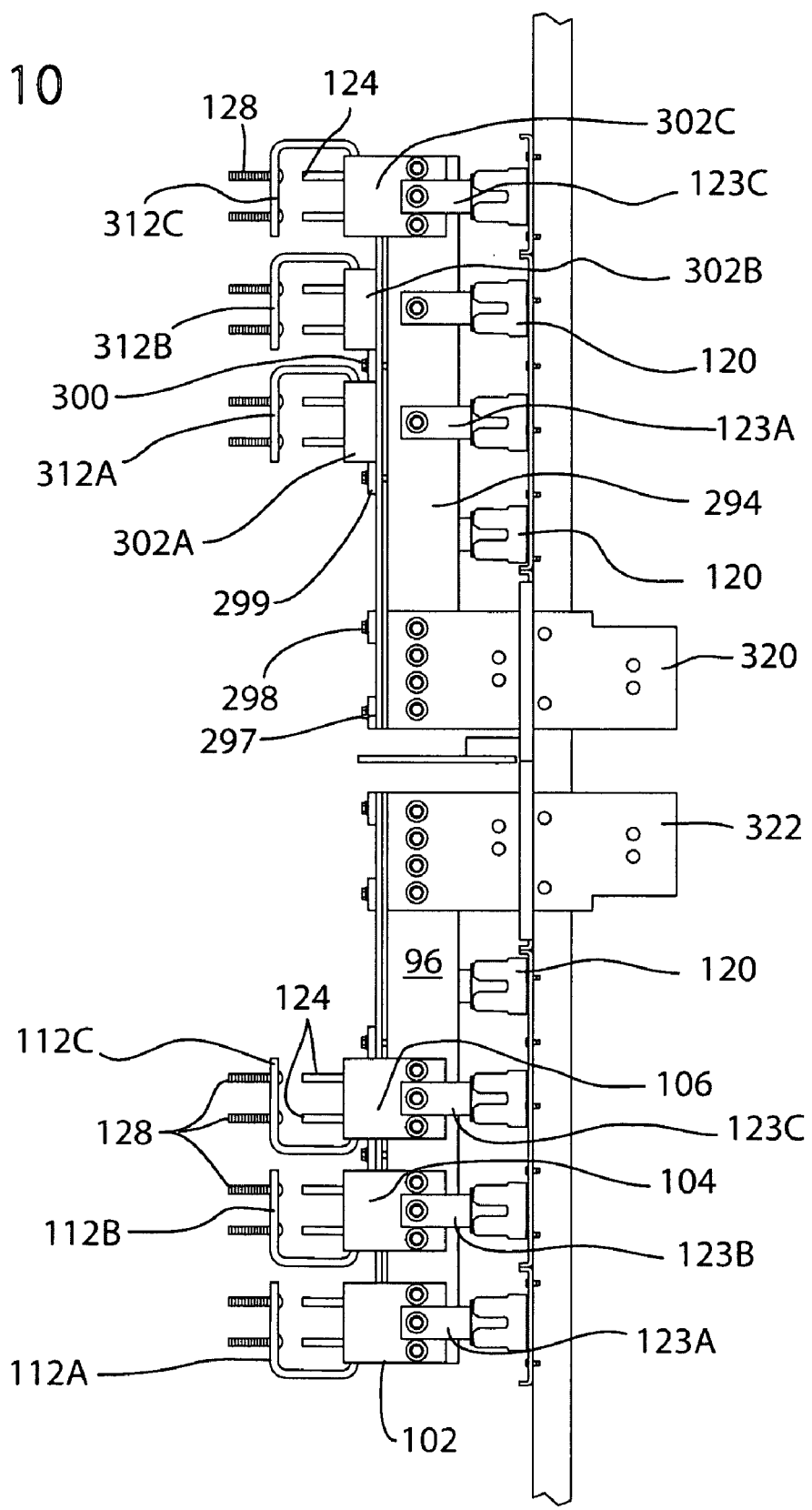

SWITCHGEAR CONDUCTORS AND CONNECTIONS THEREFORE

FIELD OF THE INVENTION

The invention relates to switchgear for low voltage electric power distribution systems. More particularly, the invention relates to a system of buses that minimize the amount of metal required therein for carrying a given electrical current. The invention also relates to connections between vertical and horizontal buses used in such switchgear.

BACKGROUND OF THE INVENTION

Low voltage switchgear assemblies are commonly used in electric power distribution systems such as those typically used to provide power to factories, buildings and commercial installations. Such assemblies are mounted in metal cabinets and include combinations of electrical apparatus for the power distribution systems. Such apparatus typically includes circuit breakers or other switching devices and switching disconnect switches to separate or isolate individual parts of the distribution system. Network protectors may also be included as well as transfer switches used for connection of the system to alternate power sources. Metering equipment and other instrumentation may also be provided.

A continuing need has existed for improved bus bar configurations that take advantage of the "skin" effect of such conductors to reduce the amount of copper required to conduct a given amount of electrical current. The skin effect is a descriptive term for the phenomenon that the bulk of electrical current flows in the outer perimeter or surface of a conductor. Thus, the material at the interior of a conductor, while just as costly to produce, is significantly less efficient in use as a conductor than the material at the perimeter. Most bus bars used in low voltage switchgear have, heretofore, been formed from flat copper bars because of ease of manufacture and assembly. It is desirable to minimize the cost of the bus bar assemblies by reducing the amount of copper contained therein.

One obstacle that has existed and has prevented the development of the most efficient bus bar configurations and geometrics has been the difficulty in connecting hollow vertical conductors with high efficiency horizontal bus bars.

SUMMARY OF THE INVENTION

The foregoing and other related needs are satisfied by various embodiments of the invention. Accordingly, the invention provides vertical bus bars of highly efficient configuration, as well as high efficiency horizontal bus bar components. Another aspect of the invention relates to provision of novel connections between the improved vertical and horizontal bus bar components.

In accordance with an embodiment of the invention, hollow vertical bus bars are formed by utilizing a pair of cooperating L-shaped conductor components which are positioned together and spaced apart a small distance to form a bus bar configuration having a hollow interior.

In accordance with another embodiment of the invention, improved horizontal bus bar components are formed by using a plurality of laminae of conductors separated by spacers to thus form a laminated bar having an enhanced amount of skin or outer perimeter surfaces. In accordance with another aspect of the invention, a plurality of such laminated conductor components are spaced apart from each other but electrically connected to each other and to a vertical bus bar.

In accordance with another aspect of the invention, the improved vertical and horizontal bus bar components are electrically connected to each other utilizing an improved connector that conductively ties together the horizontal and vertical components of the bus bar system.

In accordance with one aspect of the invention there is provided a bus assembly for switchgear that includes a pair of elongated members, each of an L-shaped cross section with a lateral side, and a transverse side integral with the lateral side. The elongated members are positioned in a juxtaposed spaced apart relationship forming a hollow rectangular tube wherein the sides are generally parallel to each other and the transverse sides are generally parallel to each other. Support members connected to the lateral sides may be U-shaped components engaging lateral exterior sides of the elongated members and may be connected to an element having a flange which extends from the bases of the U-shaped components for connection to a horizontal bus bar. A connecting device may be provided with separated extending legs adapted for attachment to components of a laminated horizontal bus member. The horizontal bus may include a plurality of laminated components which are parallel and spaced apart from each other separated by non-conductive spacer members.

Further advantages and aspects of the invention will become apparent from the following detailed description, the claims and accompanying drawings.

BRIEF DESCRIPTION OF THE DRAWINGS

The following detailed description of the invention refers to the accompanying drawings in which:

FIG. 10 is a side elevational view of the sub-assembly shown in FIG. 9.

DETAILED DESCRIPTION OF THE INVENTION

Figure 1:
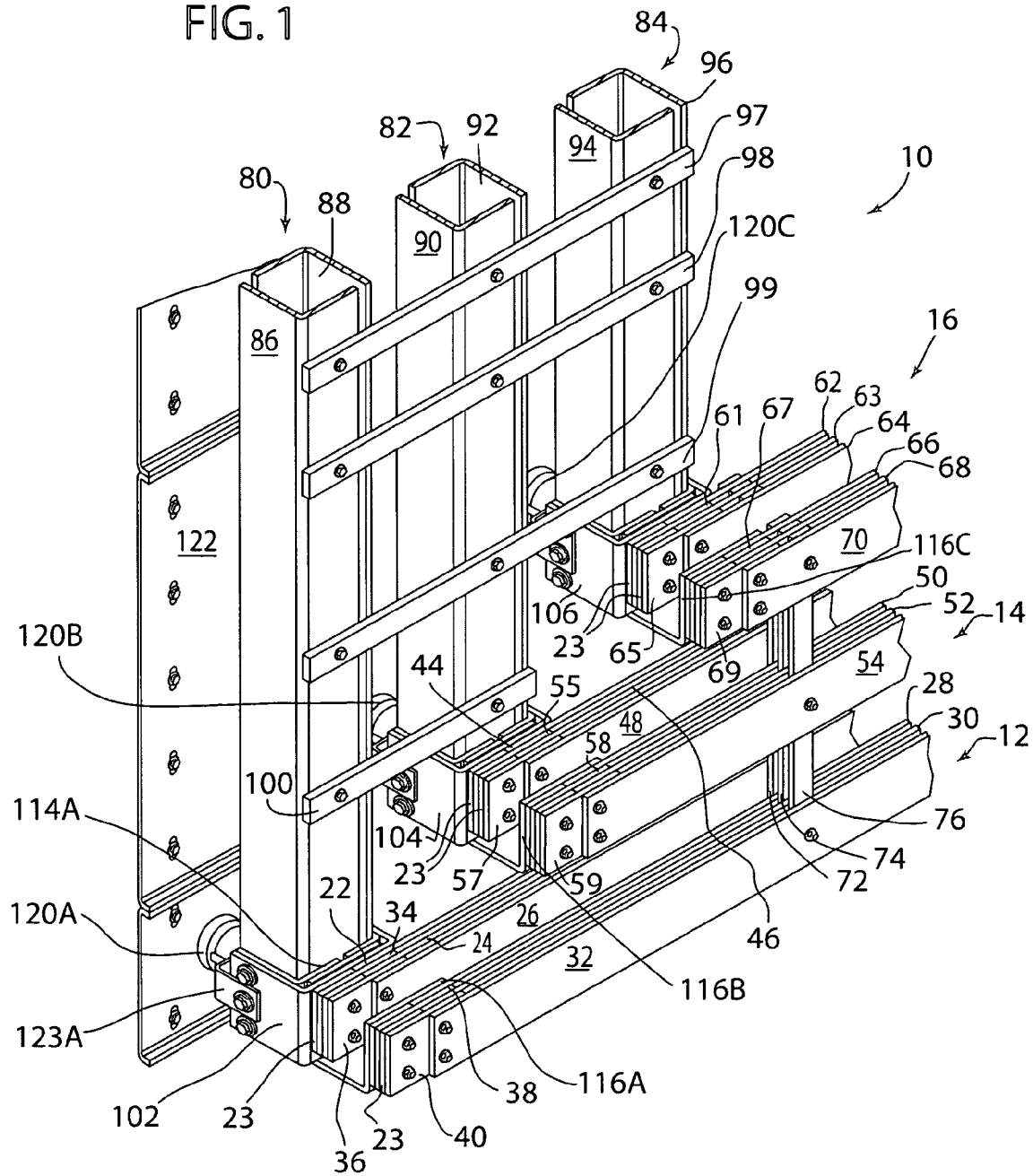
FIG. 1 is a fragmentary isometric view of a bus assembly for switchgear in accordance with the invention.

Referring first to FIG. 1, a bus assembly 10 for low voltage switchgear is shown independently of a metal cabinet of conventional design (not shown) within which it is housed. The assembly 10 includes horizontal bus assemblies 12, 14 and 16 through which multi-phase power is supplied in known fashion.

In order to maximize the surface area provided by a minimized weight of metallic conductor, horizontal bus 12 is formed by spaced sets of metal laminae 22, 24, 26, and 28, 30, 32. These laminae are spaced part by conductive spacers 34, 36, 38, and 40. In similar fashion, horizontal bus 14 is formed by metal laminae 44, 46, 48, 50, 52, and 54. Conductive spacers 55, 57, 58 and 59 separate these laminae. Generally copper is used for the conductive components of the bus assembly described herein. However, it will be apparent to those skilled in the art that other electrically conductive materials could be substituted if desired.

Also in similar fashion, the upper horizontal bus 16 is formed by laminae 62, 63, 64, 66, 68, and 70. These laminae are separated by conductive spacers 61, 65, 67, and 69. The laminae of the horizontal buses 12, 14 and 16 are also separated and held in place by non-conductive spacers 72, 74, and 76. The non-conductive material can be polymeric or plastic sheet material, for example, glass fiber reinforced polyester resin.

Figure 2:
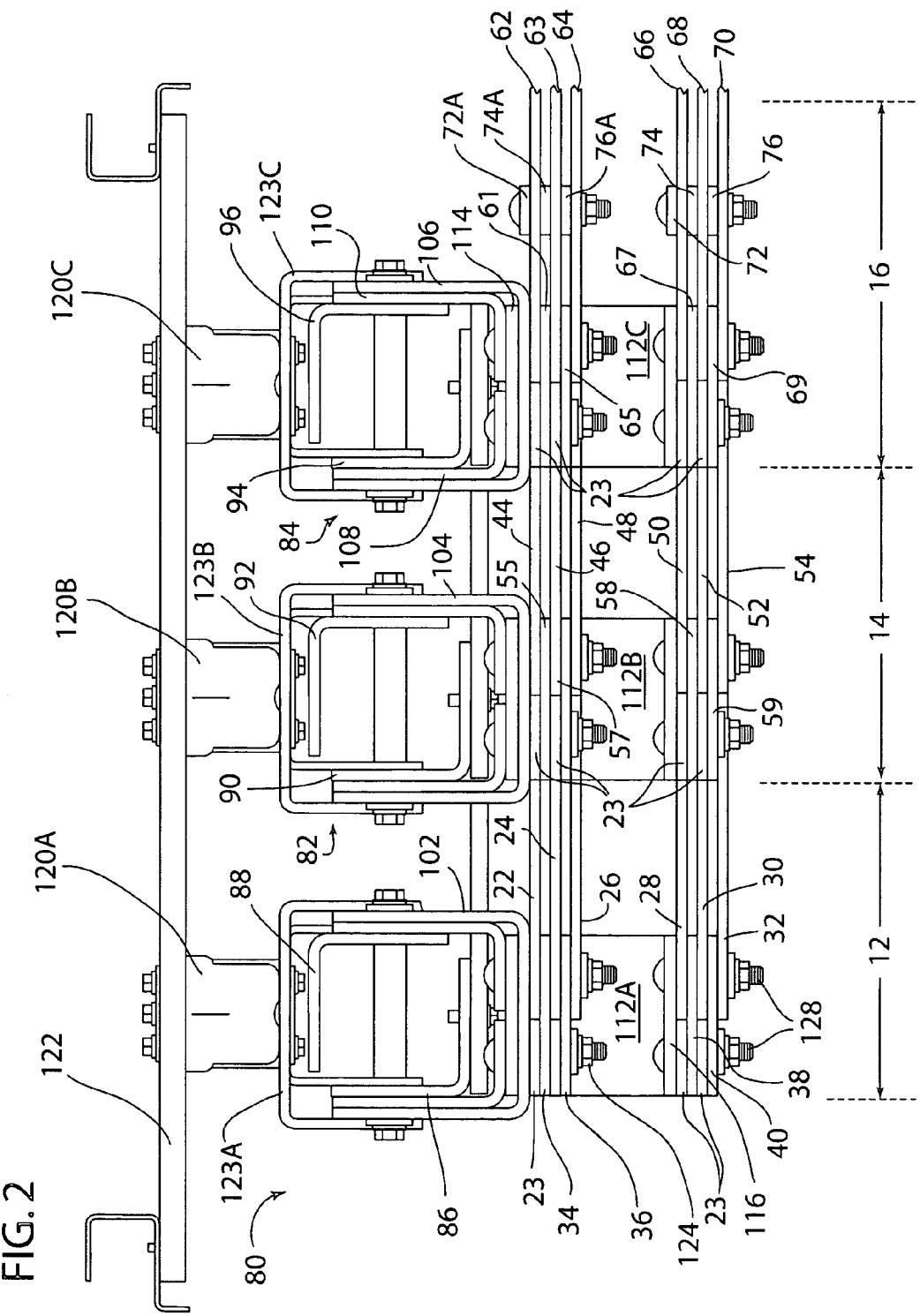
FIG. 2 is a top view of the vertical bus bar assembly of FIG. 1.

As also seen in FIG. 2, are conductive plates 23 used as spacers in the illustrated embodiment which illustrates a bus assembly that is not connected to another stack. In the event the assembly were to be connected to another similar assembly or stack, the plates 23 maybe removed and replaced by additional laminae forming an extension (to the left in FIG. 2) of the illustrated horizontal buses.

Figure 3:
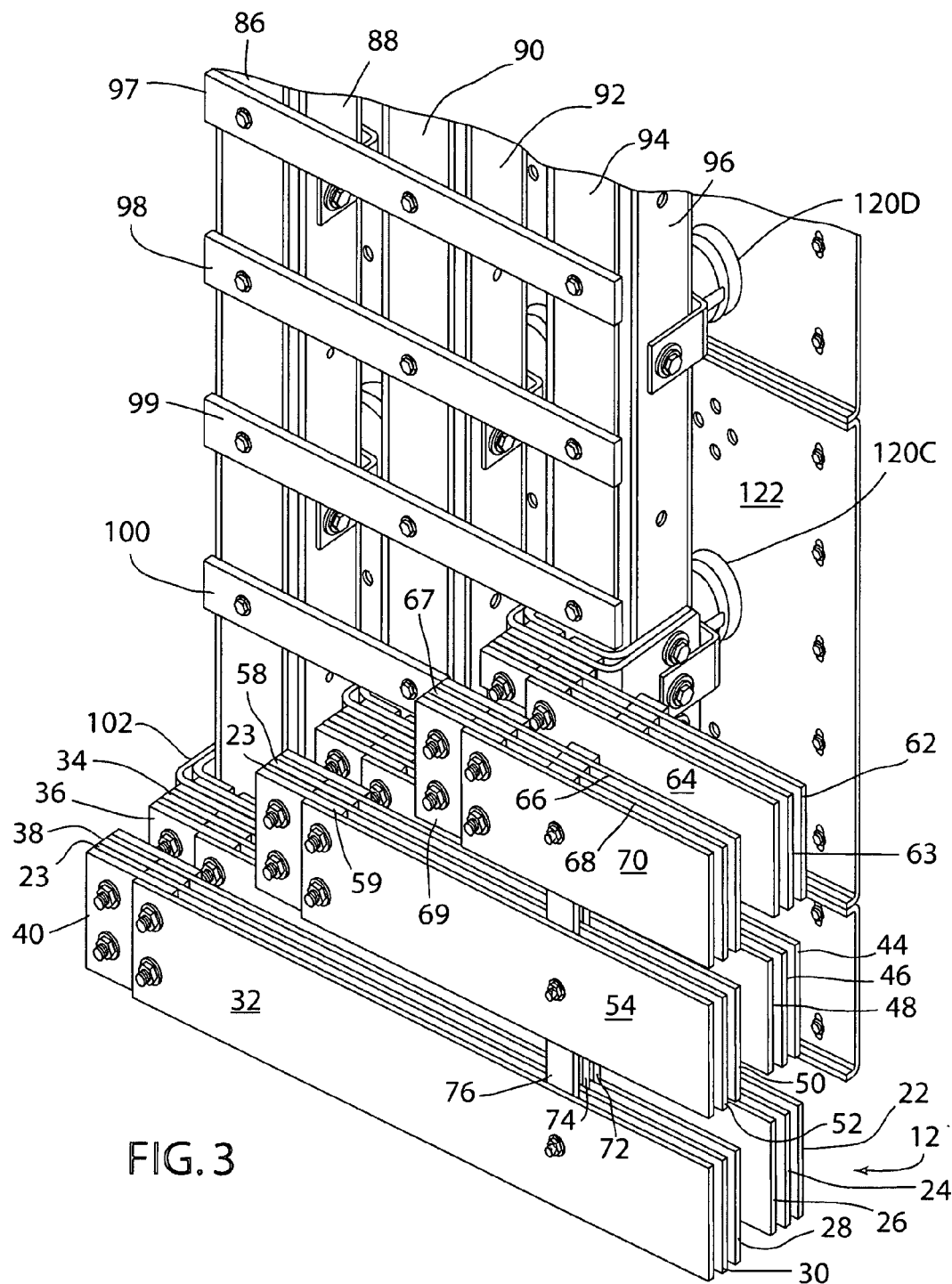
FIG. 3 is a fragmentary isometric view of the bus bar assembly of FIG. 1 viewed from a different oblique angle.
Figure 4:
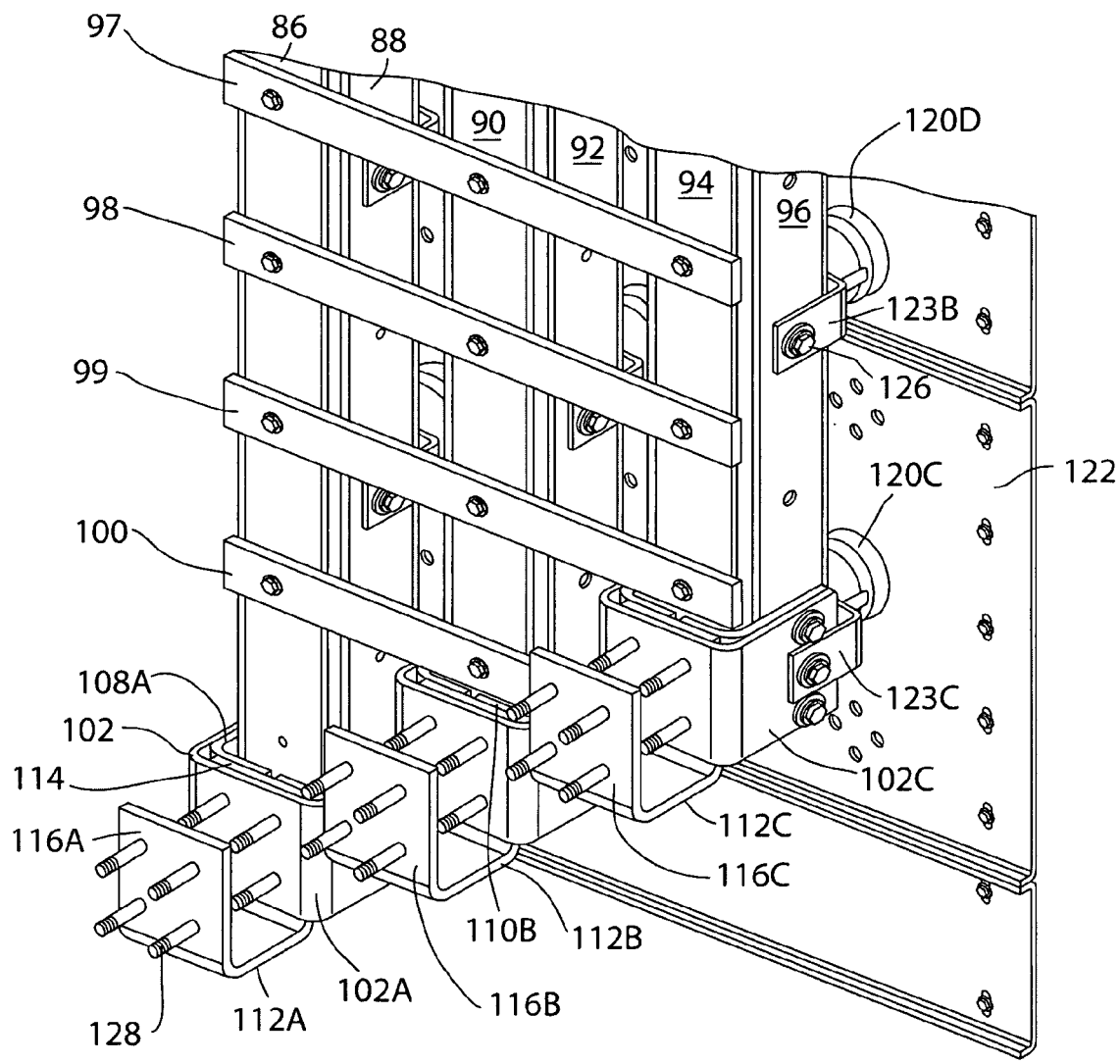
FIG. 4 is a fragmentary isometric view of the bus bar assembly of FIG. 3 with the horizontal buses removed to show the connecting brackets in greater detail.

The vertical buses 80, 82, and 84 are each formed by a pair of conductors having L-shaped cross sections, which are mounted in pairs to form buses having open interior channels. Thus, as best seen in FIGS. 1–3, vertical bus 80 is formed of L-shaped members 86 and 88. Bus 82 is formed by L-shaped members 90 and 92 and bus 84 is formed by L-shaped members 94 and 96. The vertical buses 80, 82, and 84 are supported on an aluminum plate 122, being held in place by non-conductive vibration-preventing non-metallic strips 97, 98, 99, and 100.

Figure 7:
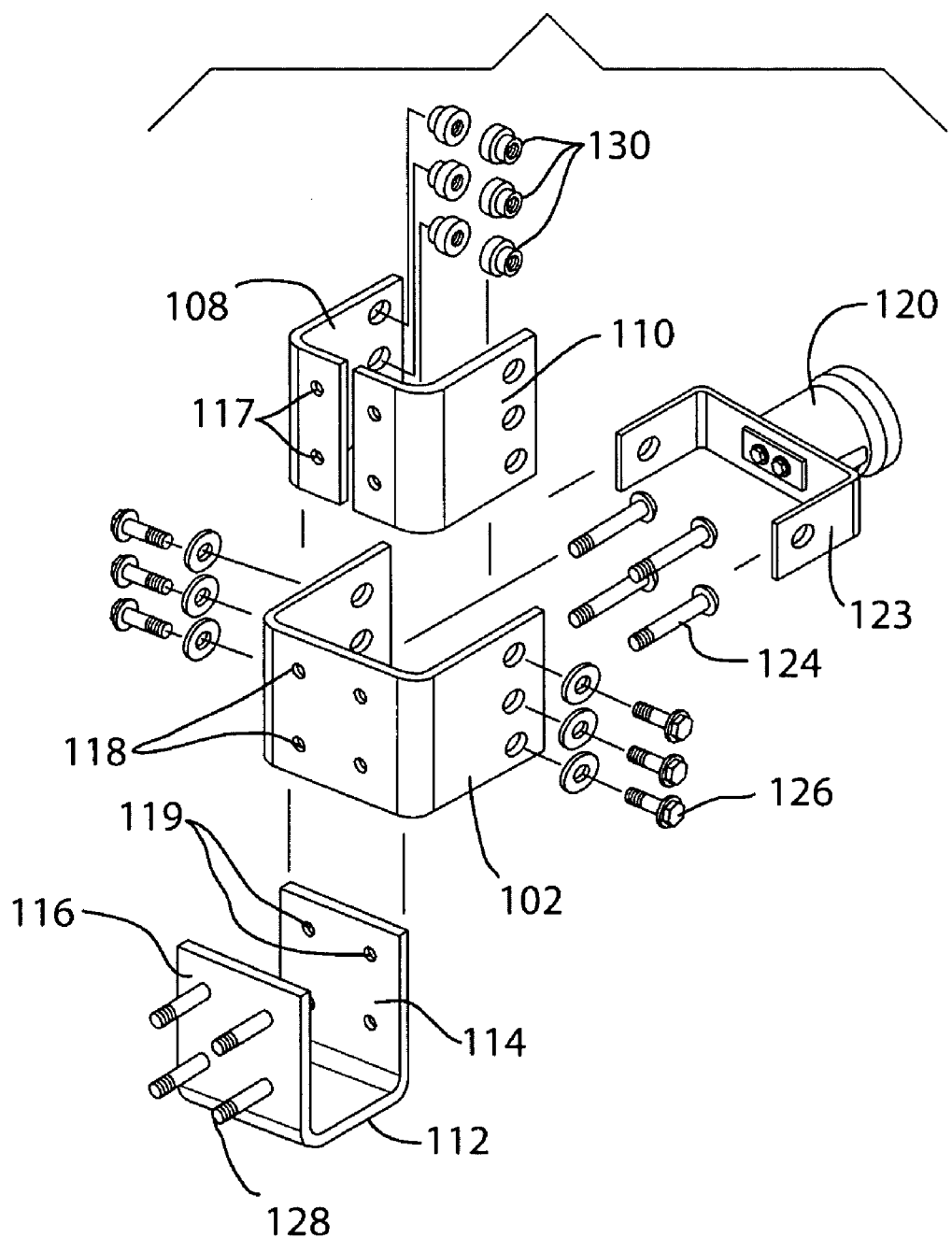
FIG. 7 is an isometric view showing the individual components of the connecting and supporting components used in connection with the illustrated embodiment.
Figure 8:
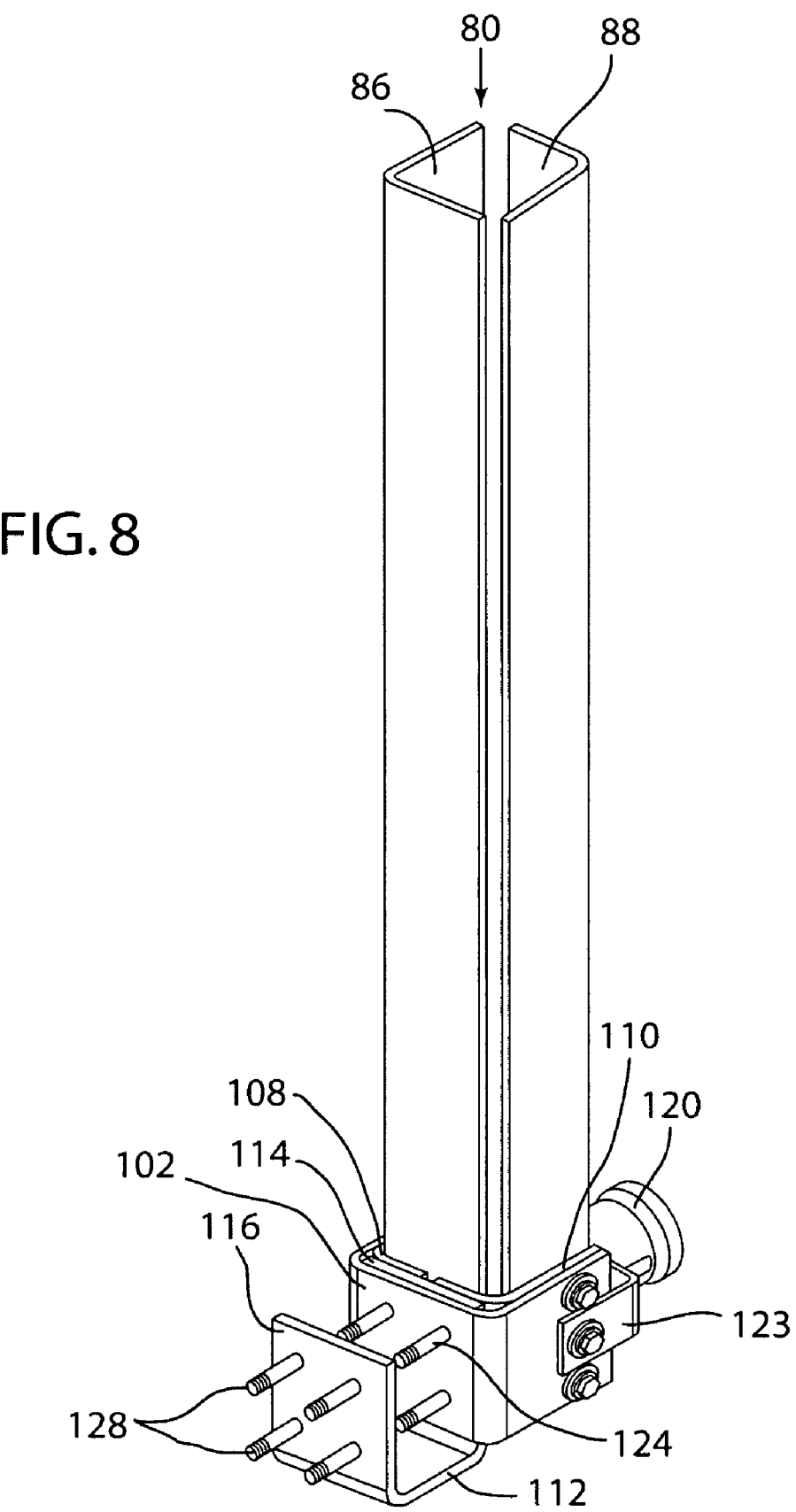
FIG. 8 is an isometric view showing a single vertical bus with connecting brackets and a support member connected thereto.

Also shown in FIGS. 1–4 and more clearly in FIGS. 7–8 (using vertical bus 80 as an example) are the connections between the horizontal and vertical buses. The connections include conductive U-shaped brackets 102, 104, and 106 which are fitted around the lateral sides and one front surface of the vertical buses 80, 82 and 84, respectively.

U-shaped bracket 102 is shown in disassembled relationship in connection with the other components of its sub-assembly in FIG. 7. In the illustrated embodiment, spacer members 108 and 110 are fitted within U-shaped bracket 102 enabling the sub-assembly to tightly engage the lateral sides of the L-shaped members 86 and 88 of vertical bus 80.

Press fit bolts are fitted in aligned openings 117, 118 and 119 through L-shaped spacer members 108 and 110, through U-shaped bracket 102 and also through a U-shaped member 112. These bolts are adapted to support the laminae 22, 24, and 26 of horizontal bus 12. Inwardly positioned leg 114 of member 112 is positioned and clamped between the vertical bus 80 and U-shaped bracket 102. Upwardly extending leg 116 of member 112 is also provided with openings through which press fit stud bolts 128 may be frictionally engaged. Bolts 128 secure the laminae 28, 30, and 32 of horizontal bus 12 to the outer surface of U-shaped member 112, as best seen in FIG. 2. Also as best seen in FIGS. 7 and 8, another U-shaped bracket 123 affixed to vertical bus 80 by means of bolts 126 supports a non-conductive support member 120 which is attached to aluminum plate 122 as best seen in FIG. 2. These non-conductive supports are denoted 120A, 120B, and 120C, supporting vertical buses 80, 82 and 84, respectively.

Also shown in FIG. 7 are press fit nuts 130 used to threadably receive bolts 126 to secure brackets 102, 108 and 110 to the vertical buses. These press fit nuts 130 are preferably received in apertures (not shown) in the L-shaped members 86 and 88. Alternatively the nuts 130 can be press fit into appropriate apertures formed in spacer members 108 and 110.

Figure 5:
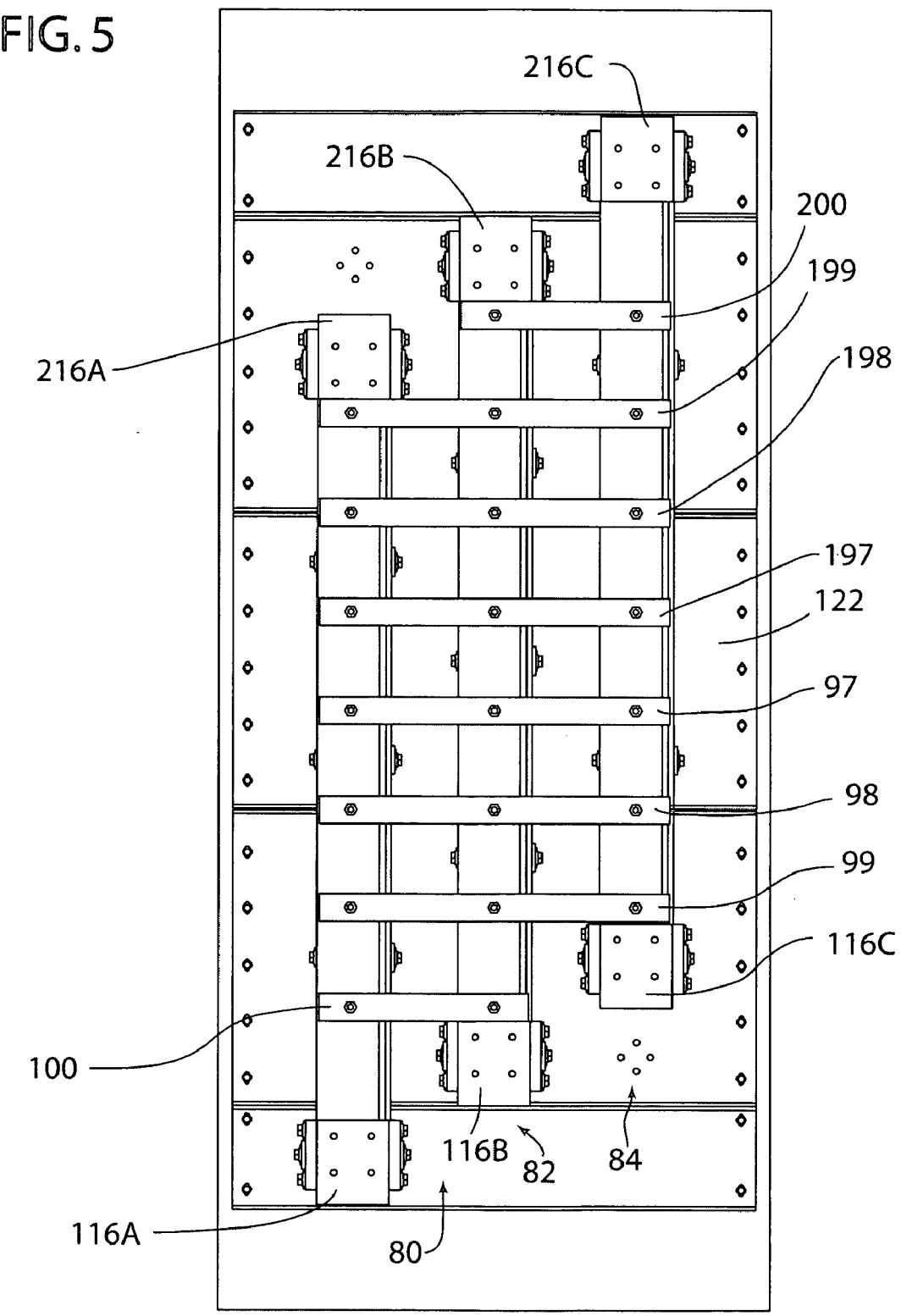
FIG. 5 is a front plan view of a sub-assembly showing upper and lower bus sections.
Figure 6:
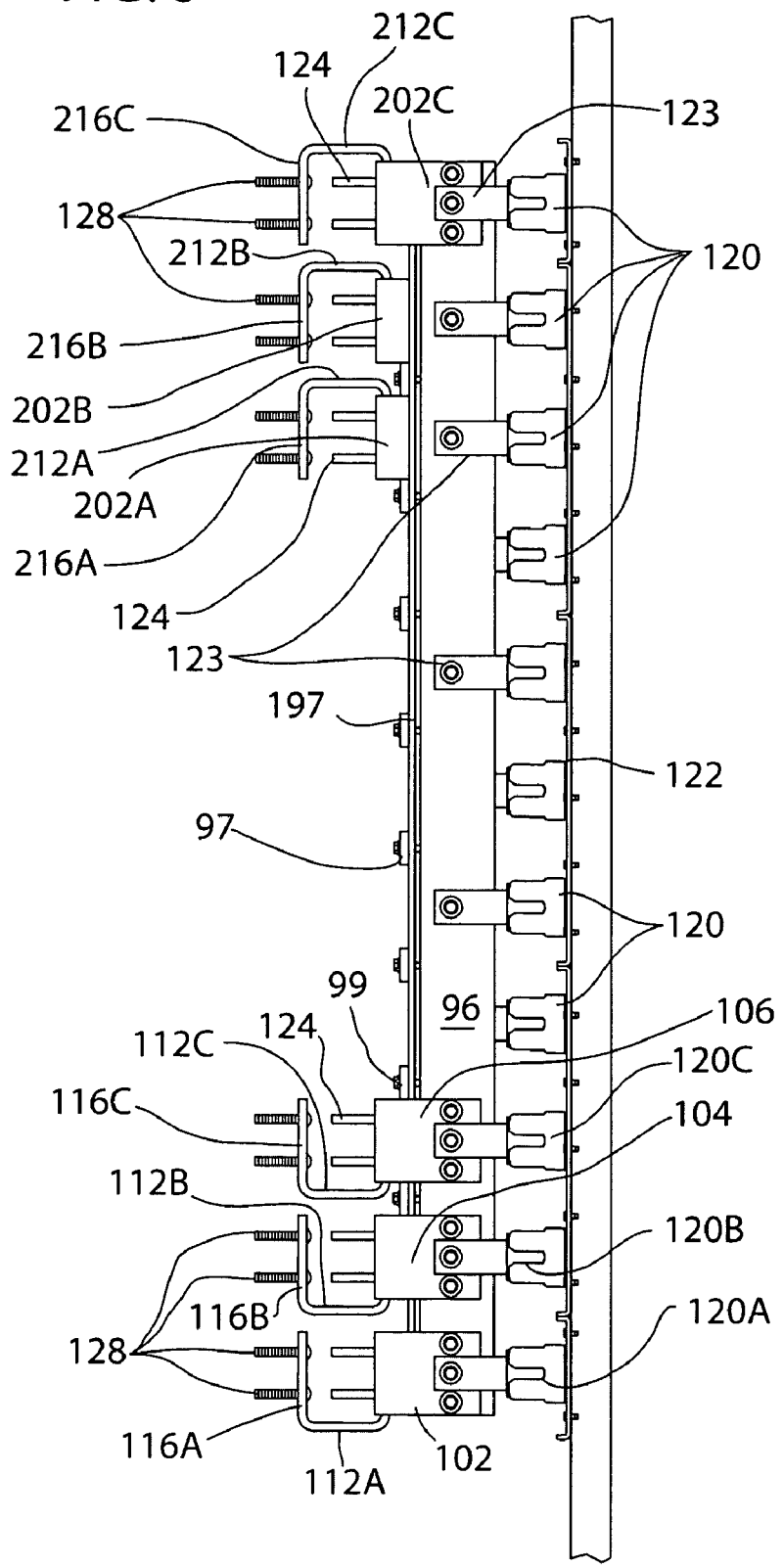
FIG. 6 is a side elevational view of the sub-assembly shown in FIG. 5.

Referring now to FIGS. 5 and 6, there is shown an arrangement of low voltage bus bars used to transfer current from a bus bar assembly of the type herein illustrated to another stack containing another set of bus bars. In this case, a set of U-shaped brackets 202A, 202B and 202C which engage vertical buses 80, 82, and 84, respectively, are used to connect the tops of the vertical buses to another set of horizontal buses (not shown) similar to laminated horizontal buses 12, 14, and 16. The sets of laminated buses are supported by conductive supporting brackets 212A, 212B, and 212C on sets of press fit stud bolts 124 and 128 in similar fashion to the embodiment previously herein described. Also as seen in FIG. 5, additional non-conductive strips 197, 198, 199, and 200 support the vertical bus bars against vibration. Supporting conductive members 212A, 212B, and 212C are similar to members 112A, 112B, and 112C at the opposite end of the assembly with the exception that they are mounted the opposite or downwardly facing direction.

Figure 9:
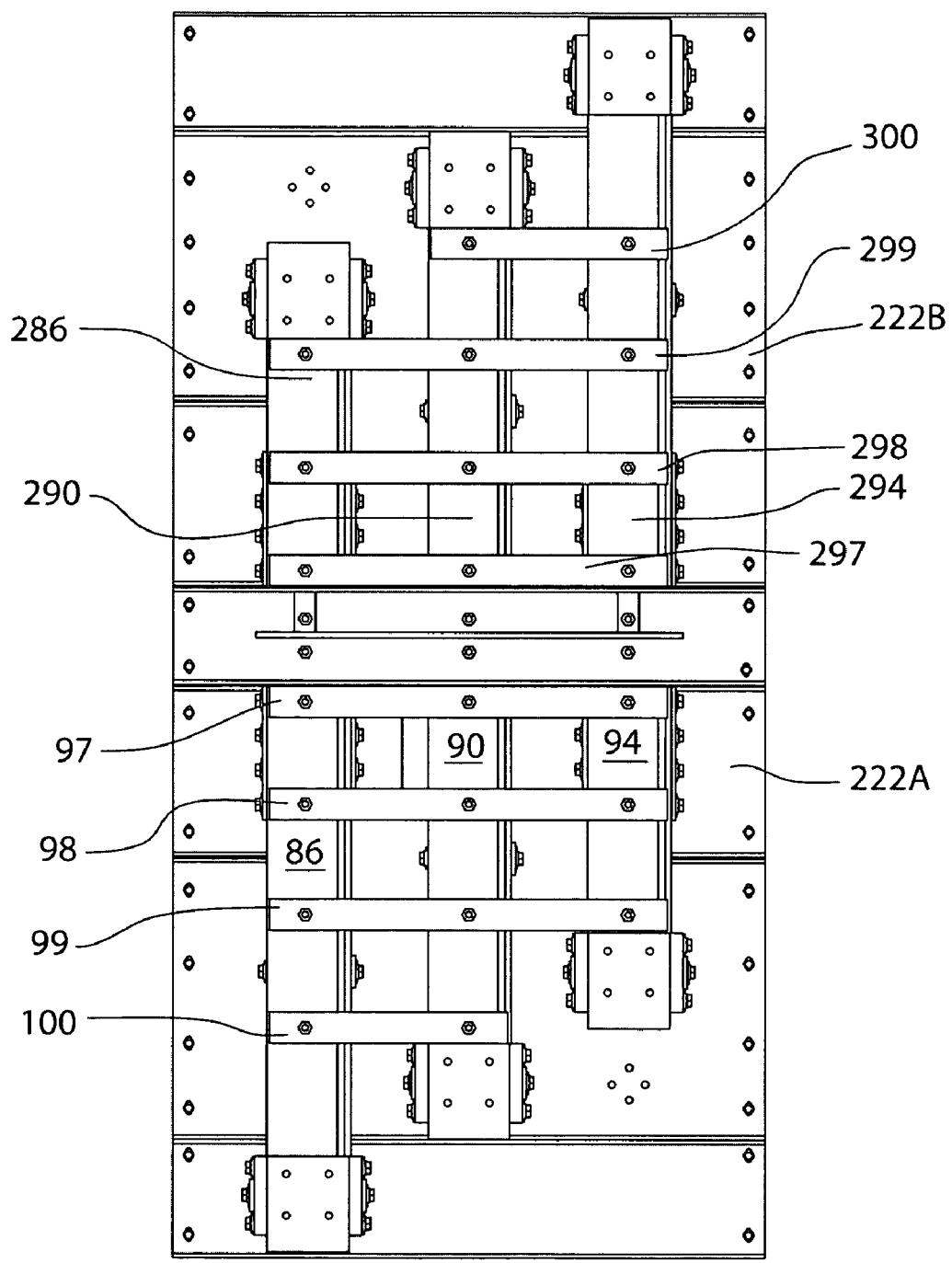
FIG. 9 is a front plan view of a sub-assembly showing upper and lower bus sections adapted for connection to a circuit breaker.

Referring to FIGS. 9 and 10, another embodiment of the invention is illustrated. In accordance with this embodiment, the panel is split and provided with upper and lower sets of vertical buses. The arrangement of FIGS. 9 and 10 is utilized when the associated power is being conducted to circuit breakers for distribution of power in an installation. In this case, a set of horizontal breakers is connected to each of the upper and lower sets of vertical buses. The current is then supplied from the vertical buses to the appropriate circuit breakers. The separated vertical bus bar sections of FIGS. 9 and 10 permit separate shutoff of power in either the upper and lower sections.

As seen in FIGS. 9 and 10, the upper set of vertical buses 286, 290, and 294 are each formed by a pair of L-shaped members similar to the lower vertical buses, 86, 90, and 94. Upper and lower aluminum plates 222A and 222B support the lower and upper vertical bus assemblies, respectively. Non-conductive strips 297, 298, 299, and 300 support the upper vertical buses. As seen in FIG. 10, the conductive U-shaped members 312A, 312B, and 312C provided for support of the horizontal buses are downwardly facing as in the case of the embodiment of FIGS. 5 and 6. U-shaped brackets 302A, 302B, and 302C engage the lateral sides of the upper vertical buses 286, 290, and 294 in similar fashion to those previously described in connection with the lower vertical bus bar members 86, 90, and 94.

Various connectors of types known in the art maybe used in connection with the assemblies of the present invention to connect the same to electrical circuits. As seen in FIG. 10, plates 320 and 322 are provided for connection of the upper and lower bus assemblies, respectively, to circuit breakers.

Also it will be apparent to those skilled in the art that the switchgear of the present invention will be mounted in a metal cabinet in compliance with electrical industry standards. By using the bus bar configurations of the present invention, the amount of copper required to conduct a given current load can be reduced approximately 50 percent. It will also be apparent to those skilled in the art that by "low voltage" as used herein, voltages below 600 volts are referred to. It has been found in practice of the invention that thicknesses of approximately 0.95 cm (⅜ inch) are suitable for the L-shaped components of the vertical buses which will typically have a length of about 1.5 m (5 feet). The horizontal buses may be provided with either more or less than the six laminae herein illustrated, depending on the amperage loads for which the system is designed. Typically the vertical buses will have an outer dimension of approximately 14 cm (5.5 inches) by 14 cm (5.5 inches).

While the invention has been described in conjunction with specific embodiments, it is evident that many alternatives, modifications and variations will be apparent to those skilled in the art in light of the foregoing description. Accordingly, the present invention attempts to embrace all such alternatives, modifications and variations that fall within the spirit and scope of the appended claims.

What is claimed is:

1. A bus assembly for switchgear comprising a pair of elongated members each of an L-shaped cross section with a lateral side and a transverse side integral with said lateral side;
   said elongated members being positioned in a juxtaposed spaced apart relationship forming a hollow rectangular tube, wherein said sides are generally parallel to each other and said transverse sides are generally parallel to each other; and
   support members supporting said elongated members in said juxtaposed position.

2. A bus assembly according to claim 1, wherein said support members are connected to said lateral sides.

3. A bus assembly according to claim 2, wherein said support members comprise a U-shaped component engaging lateral exterior sides of said elongated members.

4. A bus assembly according to claim 3 wherein said U-shaped member is connected to an element having flange which extends from a bight of said U-shaped component for connection to at least one horizontal bus bar.

5. A connecting device for joining vertical and horizontal bus bars comprising a first U-shaped member having legs adapted to engage the exterior lateral surfaces of a vertical bus member, a second U-shaped member having a leg attached to a bight of said first U-shaped member and a second leg extending away from said first U-shaped member adapted for attachment to a horizontal bus member.

6. A connecting device according to claim 5, wherein said second leg is provided with perforations adapted for securement thereto of said horizontal bus member.

7. A connecting device according to claim 5 that is provided with a third U-shaped extending member which has an extending leg spaced from said extending leg of said second member, each of said extending legs being adapted for attachment to a component of a laminated horizontal bus member.

8. A connector between a vertical bus and a horizontal bus comprising:
   a first U-shaped member adapted to engage the opposite lateral sides of the vertical bus member;
   a second U-shaped member fitted between the bight portion of said first U-shaped member and said vertical bus, said second U-shaped member having a free end spaced from said vertical bus;
   at least one fastener extending through at least one aperture extending through said second U-shaped member and terminating at a location between the ends of said second U-shaped member for supporting at least one lamina of a horizontal bus member and at least one fastener passing through at least one aperture in said free end of said second U-shaped member for supporting at least one lamina of a horizontal bus member engaging an outer surface of said second U-shaped member.

9. A connector according to claim 8 wherein each of said fasteners is adapted to support a plurality of laminae which comprise a horizontal bus member.

10. A connector according to claim 9 wherein said laminae are separated by layers of non-conductive material.

11. A bus assembly for switchgear comprising a pair of vertically oriented elongated members each of an L-shaped cross section with a lateral side and a transverse side integral with said lateral side;
    said elongated members being positioned in a juxtaposed spaced apart relationship forming a hollow rectangular tube wherein said sides are generally parallel to each other and said transverse sides are generally parallel to each other; and
    said members being connected for electrical current flow to a horizontal bus member formed by a plurality of electrically conductive laminae;
    a connector between the elongated members and said horizontal bus member comprising
    a first U-shaped member adapted to engage opposite lateral sides of the vertical elongated members;
    a second U-shaped member having an end fitted between a bight portion of said first U-shaped member and said one of said elongated members, said second U-shaped member having a free end spaced from said elongated member; and
    at least one fastener extending through at least one aperture extending through said first U-shaped member and terminating at a location between ends of said second U-shaped member supporting at least one lamina of said horizontal bus member and at least one fastener passing through at least one aperture in said free end of said second U-shaped member supporting at least one lamina of a horizontal bus member engaging an outer surface of said second U-shaped member.

12. A bus assembly according to claim 11 wherein a plurality on laminae of said horizontal member are supported on each of said fasteners.

13. A bus assembly according to claim 12 wherein said laminae are separated by layers of non-conductive material.

14. A bus assembly according to claim 11 wherein said fasteners are press fit bolts.

* * * * *